(12) United States Patent
Virtanen

(10) Patent No.: US 6,761,869 B1
(45) Date of Patent: Jul. 13, 2004

(54) PROCESS FOR PREPARING PRECIPITATED CALCIUM CARBONATE

(75) Inventor: Pentti Virtanen, Toijala (FI)

(73) Assignee: FP-Pigments Oy, Espoo (FI)

( * ) Notice: Subject to any disclaimer, the term of this patent is extended or adjusted under 35 U.S.C. 154(b) by 0 days.

(21) Appl. No.: 09/508,191
(22) PCT Filed: Sep. 8, 1998
(86) PCT No.: PCT/FI98/00700
§ 371 (c)(1),
(2), (4) Date: May 24, 2000
(87) PCT Pub. No.: WO99/12851
PCT Pub. Date: Mar. 18, 1999

(30) Foreign Application Priority Data

Sep. 8, 1997 (FI) .................................................. 973632

(51) Int. Cl.$^7$ .............................................. C01F 11/18
(52) U.S. Cl. ...................................................... 423/432
(58) Field of Search ........................................ 423/432

(56) References Cited

U.S. PATENT DOCUMENTS 5,376,343 A * 12/1994 Fouche ....................... 423/165
5,494,651 A * 2/1996 Minayoshi et al. ......... 423/432
5,558,850 A * 9/1996 Bleakley et al. ............. 423/432
5,695,733 A * 12/1997 Kroc et al. .................. 423/432

FOREIGN PATENT DOCUMENTS

WO          A19711030          3/1997

* cited by examiner

Primary Examiner—Stanley S. Silverman
Assistant Examiner—Edward M. Johnson
(74) Attorney, Agent, or Firm—Birch, Stewart, Kolasch Birch, LLP

(57) ABSTRACT

According to the process, limestone is burned at a high temperature to form calcium oxide and, thereafter, calcium carbonate is formed from calcium oxide in the presence of water and carbonate ions and the formed calcium carbonate is recovered. The formation of the carbonate may be performed by carbonating calcium oxide with carbon dioxide gas in the presence of water or water vapour, or by reacting calcium oxide with soda solution. According to the invention calcium oxide is converted to calcium carbonate without separate slaking and essentially without intermediate storage, in particular without intermediate storage between the burning of the starting material and the forming of calcium carbonate. With the aid of the invention a quite advantageous solution in view of heat economy is achieved.

29 Claims, 2 Drawing Sheets

PROCESS FOR PREPARING PRECIPITATED CALCIUM CARBONATE

Figure 1:
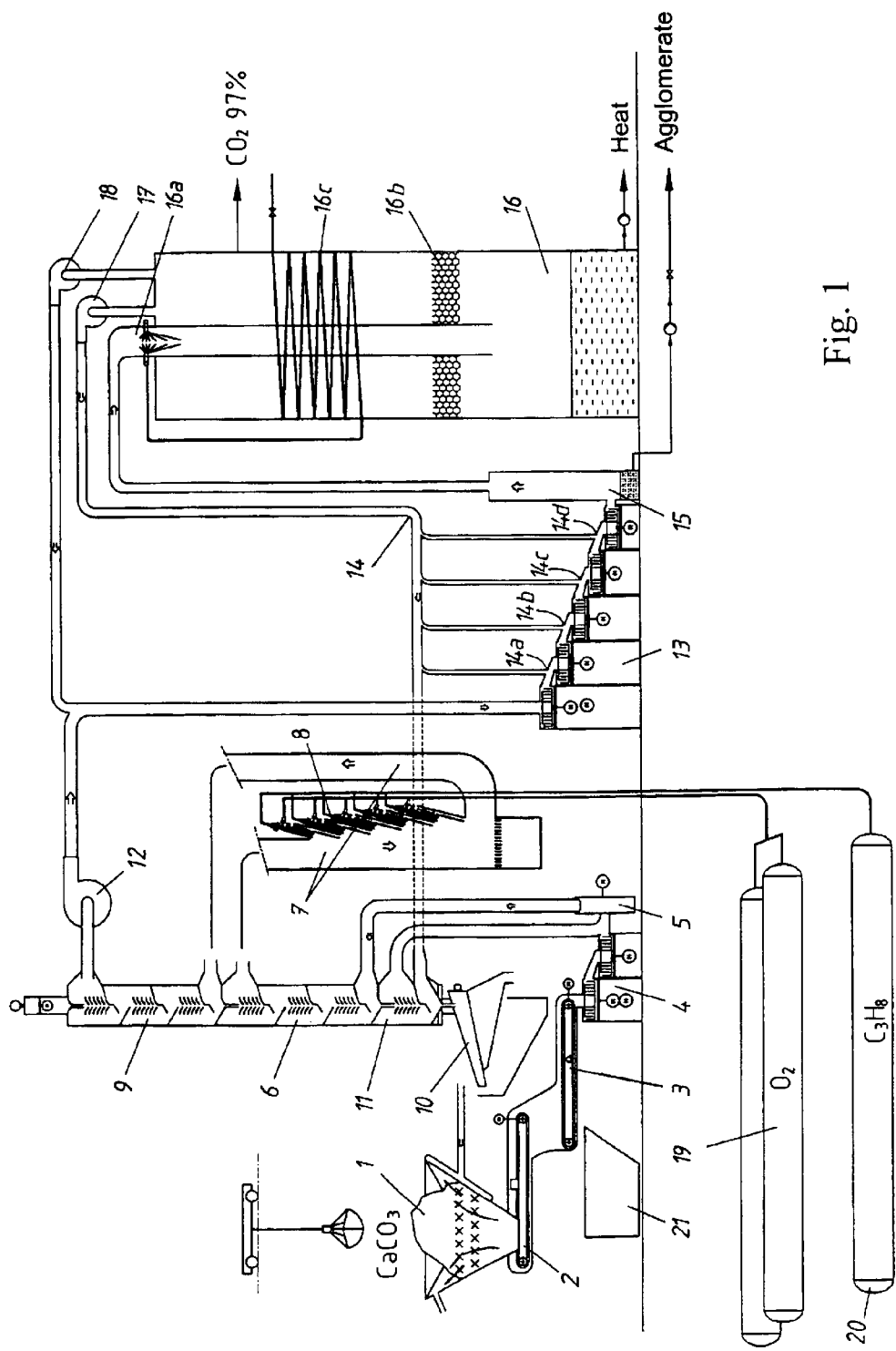

This application is the national phase under 35 U.S.C. §371 of PCT International Application No. PCT/FI98/00700 which has an International filing date of Sep. 8, 1998, which designated the United States of America.

The present invention relates to a process for preparing precipitated calcium carbonate. According to such a method the calcium carbonate is produced by reacting calcium oxide with carbonate ions in a medium.

The invention also relates to an apparatus for preparing precipitated calcium carbonate.

The use of calcium carbonate, particularly precipitated calcium carbonate, is becoming increasingly common within many industries, such as within the paper, the plastics and the pharmaceuticals industry. The aim is to formulate of the precipitated calcium carbonate (PCC) a finely divided, pure pigment which is as white as possible for many purposes.

The production of PCC usually begins with slaked lime or calcium hydroxide which is carbonated with flue gases or subjected to causticizing using sodium carbonate or ammonium carbonate. Very finely divided pigments are often prepared by mixing calcium chloride and ammonium carbonate or soda (sodium carbonate).

The calcium hydroxide, then, is obtained by burning a calcium carbonate-containing starting material, such as limestone, in a vertical or round kiln to form calcium oxide, which is conventionally slaked to obtain calcium hydroxide. It has generally been thought that lime burning must be performed in large units such as are represented by vertical and pipe furnaces. A large unit has been seen as representing an economical process.

What is characteristic of the prior-art solutions is that all operations are carried out in different places because one customer needs burnt lime, another one slaked lime, while a third one requires reprecipitated calcium carbonate. Such operations at different stages and different locations entail transportation and storage which incur significant costs. It is characteristic of the present invention that these operations can be carried out either at the same location or, in certain situations, at different locations.

It is the aim of the present invention to remove the drawbacks hampering the prior art and to obtain an entirely novel type of solution for the preparation of precipitated calcium carbonate.

During the past few years the focus of environmental protection within the sector of power plant technology has been on removing the sulphur dioxide generated during the combustion of fuels. In this connection, much research has been carried out on the use of calcium carbonate as a sorbent which is calcinated in the power plant furnace, and the calcium oxide thus obtained reacts further with sulphur dioxide, in part directly and in part in a so called activation reactor. It has been found during these tests that the conversion of finely ground calcium carbonate into an oxide can occur in <0.5 seconds at a temperature of approximately 1000° C.

The present invention has developed these techniques further. It has namely been found possible to turn the calcium oxide directly into calcium carbonate in one process step without first having to slake it to obtain calcium hydroxide. On the other hand it has also been found that it is both technically and economically advantageous to recombine the calcium oxide and the carbon dioxide released during combustion. In short, the process of the present invention has two important embodiments whereby the first one comprises converting calcium oxide into calcium carbonate without any separate slaking or intermediate storage. In the second embodiment the calcium carbonate containing starting material is decomposed thermally and combined to form a new precipitated calcium carbonate without having to separate the products from each other for storage and without performing separate intermediate steps.

Of the above-described solutions the latter can be carried out by means of an apparatus comprising connected units for grinding limestone and for burning the ground limestone to obtain calcium oxide, a reaction unit for the calcium oxide to obtain carbonate, and a gas recovery and circulation unit. Between the units, finely divided lime or, correspondingly, calcium oxide is transferred along canals in the form of a fluid comprising solids and carrier gas.

In more detail the process according to the invention is mainly characterized by what is stated in the characterizing parts of claim 1 and, correspondingly, claim 2.

The apparatus according to the invention is characterized by what is stated in the characterizing part of claim 25.

The invention offers considerable benefits. Thus, from the point of view of thermal economy, a better solution is achieved by means of the method than by conventional lime burning, and all of the heat is recovered, even if at a lower temperature. Even the heat which is removed along with the hot product is of advantage in a northern climate in wintertime because the product can be taken to the user without being frozen.

According to the invention, the calcium carbonate powder is disintegrated into calcium oxide and carbon dioxide at an elevated temperature of approximately 800 to 1400° C., the mixture is cooled and the final temperature is slaked with water. Next, the mixture undergoes intensive stirring, and as the end product, a 10 to 100%, for example, advantageously an approximately 60 to 80% PCC slurry is obtained directly. The solids content of the product can be adapted according to use. A product suited for use as a filler, for instance, can be prepared as an approximately 20% slurry, whereby no dispersing agents are needed. The solids content of a slurry suited for use in coating mixes may be 60 to 80%, but it is also possible to recover the PCC as a dry powder.

It is also possible to recover the calcium oxide and the carbon dioxide separately from the burning of the calcium carbonate powder. The solution is applicable both to carbon dioxide carbonating and to carbonating using known soluble carbonates, whereby, in the latter case, the carbon dioxide can be used in some other process.

One of the key ideas behind the invention is further that gas, liquid and solids are taken forward as a so called fluid, whereby the problems relating to the high viscosities and putty-like composition normally caused by the high solids contents can be controlled. In this context, a fluid is a mixture of solids and gas, possibly containing water which is present as a mist, i.e. as fine water drops. Thus, a fluid comprises a mixture of suspension and aerosol.

The starting material for lime is calcium carbonate which is converted into calcium oxide at a high temperature, the calcium oxide is slaked and calcium carbonate is formed from the calcium oxide in the same process without separating the reaction products from each other. Thus, in the inventive process, all unnecessary separation of gas and solids and water has been eliminated. Hence, according to the invention, new surface and particle shape are created in a process lasting about 3 to 10 seconds in all from the moment the calcium carbonate stone reaches the first grinder and when the same material leaves the last reaction mixer in the form of a completed aqueous slurry.

According to the invention, calcium carbonate is formed of calcium oxide in the presence of water and carbonate ions (or a precursor thereof).

According to a preferred embodiment, the calcium oxide is carbonated with carbon dioxide gas in the presence of water to form PCC. In water, the carbon dioxide forms carbonate ions. It is particularly advantageous to use such carbon dioxide gas for carbonating which has mainly been obtained from the preceding lime burning.

According to a second advantageous embodiment the PCC is prepared by reacting the calcium oxide with an aqueous solution of an alkali metal carbonate. Hereby a separately prepared alkali metal carbonate solution is fed straight into the causticizing reaction. The concentration of the alkali metal carbonate is approximately 5 to 40% by weight, whereby an alkali metal hydroxide solution having a concentration of appr. 10 to 30% by weight is obtained as a by-product of the reaction.

The calcium carbonate-containing limestone used as starting material in the invention is first ground into the desired particle size. As grinder, a pressure roll grinder or a shock grinder, for example, may be used. In general, most of the stone is ground to a particle size of less than 100 $\mu$m, advantageously at least 50% of the particles are smaller than 90 $\mu$m. Preferably, a great bulk are smaller than 10 $\mu$m whereby essentially all silicate minerals can be separated from the limestone.

The grinding, as well as the following treatment steps, are advantageously carried out in air-free conditions, preferably in a carbon dioxide environment possibly containing water vapour and/or mist.

The powdered lime is transferred from the grinding step to preheating along a pipe equipped with a pressure-generating device. As the pressure-generating device, a suitable grinder or a corresponding device having a grinding property may be used. During preheating, the temperature of the powder is raised to above 500° C., preferably above 700° C., whereafter the lime is burnt in the presence of oxygen to produce calcium oxide. In the process the lime burning is performed with pure oxygen in a gaseous atmosphere in the presence of much carbon dioxide, as was stated above. This solution enables as closed a gas circulation, and therefore heat recovery, as possible, resulting in an advantageous thermal economy. The purity of the oxygen usually exceeds 80%.

In the burning of limestone, the hydrocarbon used comprises, e.g. propane, butane, kerosene, diesel oil, alcohol, vegetable oil, natural gas or biogas.

The present implementation has been made economical and therefore possible by the new advantageous methods for producing almost pure oxygen, such as molecular sieves and the PSA (Pressure Swing Absorption) method derived therefrom for separating oxygen and nitrogen.

The calcium oxide powder obtained from burning is taken via cooling further to carbonate formation which may take place through a carbonating or causticizing reaction, as stated above. In accordance with the invention it has been found that in numerous contexts the alleged precondition that the calcium oxide must be slaked before being carbonated, no longer holds true, but that the desired finely divided PCC is even more easily obtained when the slaking and the carbonating are performed simultaneously under intensive stirring. If desired, the calcium oxide can, however, also be slaked before being taken to the formation of calcium carbonate.

According to a particularly advantageous embodiment the carbonating, or, correspondingly, the causticizing, is carried out under an intensive turbulence in a turbulence zone such that the calcium oxide is reacted with water and/or water vapour via the intermediation of random pearls of carbon dioxide or carbonate compound. Thus, in the reaction the gas, liquid and solids particles are simultaneously contacted with each other under an intensive turbulence and a great energy intensity. The gas flow absorbs the liquid and the particles, forming a turbulent three-phase mixture. The solution according to the invention may also be termed a "three-phase" process, as three phases are simultaneously present.

The apparatus according to the invention comprises at least two pin mills or shock grinders arranged in cascade and having one or several rotatable vane rings which can be used to impose a great energy intensity on the material fed into the apparatus. Instead of a pin mill, the carbonate reaction unit may comprise several cascaded pearl mills or successive mixing zones formed by similar mixing/grinding apparatuses. The first mixing zone is equipped with inlets for at least lime oxide, carbon dioxide and water vapour/water as well as an outlet for the reaction product, and the second one is equipped with an inlet for the product from the previous mixing zone and an outlet for the reaction product. Gas or mixing liquid can be fed between the rotating vane rings or groups of vane rings of the pin mills. The pin mills are interconnected by means of pipes which may, if desired, be furnished with inlets for the mixing liquids. The carbonating, or correspondingly, causticizing of calcium oxide takes place very rapidly in the apparatus. The residence time of the reaction is as short as less than 1 second.

The conversion of calcium carbonate increases from step to step; depending on the dry matter content of the calcium carbonate, it is usually already close to 100 after three or four steps. By dividing the method into steps, blend components can be added to the different layers of the $CaCO_3$ particle, which components affect, among other things, the opacity and acid resistance of the product and may, on the other hand, act as dispersing agents.

According to the invention, in carbonate formation the reactants are taken to an intensive turbulence having an energy intensity of >1000 $kW/m^3$.

The volume fraction of the calcium oxide/calcium hydroxide/calcium carbonate solution/slurry of the gas volume of the apparatus is small, typically smaller than 1%, preferably about 0.1 to 5%. By way of citing an example it may be mentioned that about 10 to 200 $cm^3$, advantageously about 50 to 150 $cm^3$, of calcium oxide and water or water vapour may be fed into an apparatus having a gas volume of about 40,000 $cm^3$, and an energy of about 2,000 kW is imposed on this aerosol pre cubic metre. Due to the great energy intensity the carbonating or the causticizing may be carried out at a high solids content (10 to 100% by weight).

Any apparatus can be used for providing the turbulence, i.e. as the turbulence zone, which can be used to generate a high energy intensity in a gas volume. The apparatus used is advantageously a so called pin mill or a similar device (a shock mixer) or a pearl mill. An advantageous apparatus is described e.g. in WO Published Application No. 96/23728. The apparatus in question is mainly filled with reagent gas and only has small volumes of materials in e.g. liquid or solid phase. The condition can also be met in e.g. disk or cone refiners designed for an entirely different purpose.

The calcium carbonate obtained in the invention is of homogeneous quality. The primary diameters of the PCC particles prepared may generally be within the range from 10 to 100 nm, usually 20 to 50 nm, for minute PCC particles are produced on the surface of the lime particles during carbonating or, correspondingly, causticizing. Due to the turbulence provided by the mixer, however, these particles are separated from the surface of the calcium oxide or calcium hydroxide particles. In the mixer fluid they do not remain independent and the primary particles rapidly combine to form bigger particle aggregates or clusters of about 10 to 30, typically about 15 to 20 particles. The clusters have a size of 50 to 100 nm. The aggregates provide agglomerates or botryoidal bunches containing about 500 to 600 aggregates connected to each other. The bunches have a size of about 500 nm. They are quite strong and withstand the turbulence of the reactor. When growing bigger, looser grid agglomerates, the turbulence is reduced. The formation of these agglomerates can be carried out by adjusting the pH value such that the Z potential of the particles is as small as possible. The particles can also be used to coat other pigments, such as kaolin, chalk, talcum or titanium dioxide. The coating can be performed by feeding the pigments to be coated e.g. in the form of an aqueous slurry together with calcium oxide and carbon dioxide into the apparatus of the invention and, if necessary, by adjusting the pH to a suitable value by means of carbonic acid or some other acid (e.g. phosphoric acid).

In the following, the invention is examined in more detail by means of a detailed description and with reference to the annexed drawings.

Figure 2:
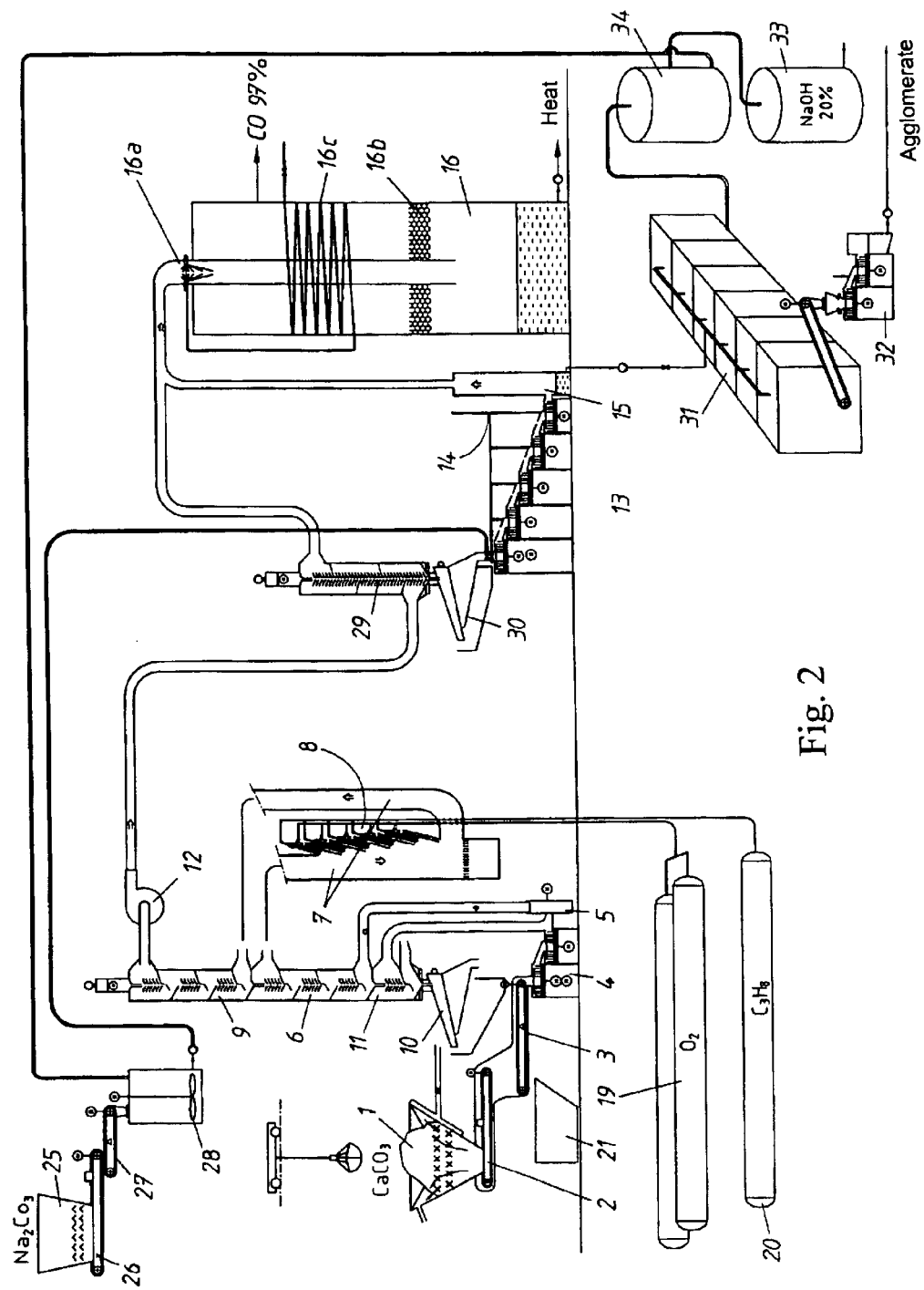

FIG. 1 is a skeleton diagram of the basic structure of an advantageous embodiment of the apparatus according to the invention, and FIG. 2 is a skeleton diagram of a process application of another advantageous embodiment of the invention.

The following reference numerals are used in both FIGS. 1 and 2:

| 1 | Storage hopper for limestone |
|---|---|
| 2 | Belt conveyor and metal detector |
| 3 | Weighing |
| 4 | Grinding of limestone |
| 5 | Blower |
| 6 | Preheating of ground limestone |
| 7 | Flame tubes |
| 8 | Main burner |
| 9 | Cooling of burnt lime and carbon dioxide |
| 10 | Apparatus for treating heat transfer material |
| 11 | Aftercooler |
| 12 | Blower |
| 13 | Carbonating apparatus |
| 14 | CaO slaking and cooling water |
| 15 | PCC separator |
| 16 | Jet condensing system |
| 16a | Jet condenser |
| 16b | Drop separator |
| 16c | Condenser |
| 17 | Supply of additional carbon dioxide |
| 18 | Supply of additional carbon dioxide |
| 19 | Molecular sieve |
| 20 | Propane container |
| 21 | Waste receiver |

FIG. 2 further contains the following reference numerals:

| 25 | Storage hopper for soda |
|---|---|
| 26 | Belt conveyor |
| 27 | Weighing |
| 28 | Dissolution of soda |
| 29 | Separator for burnt lime/circulation gas |
| 30 | Apparatus for treating separated material |
| 31 | Filter |
| 32 | PCC after-treatment |
| 33 | Sodium hydroxide container |
| 34 | Steeping |

The circulation of carbon dioxide denoted by the reference numerals 17 and 18 is not present in the embodiment of FIG. 2.

FIG. 1 is a schematic representation of an apparatus for producing PCC wherein the production is based on a carbonating reaction. The apparatus comprises a unit (reference numerals 1 to 4) for mechanically treating the raw material, i.e. limestone, a limestone burning unit (reference numerals 5 to 12), a carbonating unit (reference numerals 13 to 15) and lastly, a gas recovery and circulation unit (reference numerals 16 to 18).

In the storage hopper I the crushed limestone is preheated and, if necessary, the snow and ice which is mixed with the limestone is melted. The limestone is taken to a belt weigher 3 by means of a belt conveyor 2. The speed of the conveyor is regulated by controlling the amount of limestone introduced into the process. A metal detector is provided in connection with the belt conveyor and can be used to detect possible metal items which are separated and transferred to the waste receiver 21 by means of the weigher belt 3.

A weighed amount of limestone is then fed into a grinding step 4 where the limestone is refined in a two-phase shock refiner, thus obtaining a limestone powder, 90% of whose particles have a size <90 μm. From the grinding step 4 the powder is taken to the preheater 6 by means of the blower 5. Additional gas is taken to the suction face of the blower from the jet condenser 16.

The preheating of the ground limestone takes place in a heat exchanger 6, 9, the limestone being preheated in the lower part 6 thereof and the burnt limestone (calcium oxide) and the carbon dioxide being cooled in the upper part 9 thereof In the preheating section 6 the hot (800 to 900° C.) heat transfer material flows downwards along the central passage of the heat exchanger, and the fluidized limestone powder is blown through the bed thus formed in multiple steps in accordance with the counterflow principle. When entering the heat exchanger the fluid is at a temperature of 20 to 100° C. and in the heat exchanger the temperature rises to approximately 700° C. At the same time, the temperature of the heat transfer material is reduced to approximately 200° C.

The preheated limestone powder is then forwarded to limestone burning 7 where carbon dioxide is separated from the calcium carbonate, thus obtaining burnt lime, or that is, calcium oxide, in accordance with the following equation: $CaCO_3 \rightarrow CaO+CO_2$. The burning takes place in a fluid tube 7 where the temperature of the particles rises to approximately 900 to 1400° C., which is achieved by means of the burners 8. In the burners, propane is burnt with oxygen, whereby carbon dioxide and water vapour are released in the reaction $C_3H_8+5O_2 \rightarrow 3CO_2+4H_2O$. The propane is introduced into the burning from the propane container 20 and the oxygen from the oxygen source 19 where it is separated from air, e.g. by means of a molecular sieve, thus obtaining pure $O_2$ at a pressure of, for example, 2 bar.

The cold heat transfer material obtained from the limestone preheating unit 6 is cooled from 200° C. to approximately 20 to 100° C. by means of a gas flow, simultaneously separating the fine constituents using a heat transfer material treatment apparatus. Cold heat transfer material is used for cooling burnt lime and carbon dioxide in the cooling part 9 of the heat exchanger. At the same time, the regeneration of the heat transfer material is achieved. Thus, the heat transfer material is taken downwards along the central passage of the heat exchanger 6, 9 and the burnt limestone powder is taken through the bed thus formed in multiple steps in accordance with the counterflow principle. When entering the heat exchanger, the temperature of the fluid obtained from the burning step is 900 to 1000° C. and in the heat exchanger the temperature declines to approximately 200° C. At the same time the temperature of the heat transfer material rises to approximately 800° C.

As the heat transfer material, 1 to 5 mm crushed limestone can be used. The apparatus comprises means (not shown) for the sorting and additional metering of limestone as well as an elevator conveyor 11 and a shaker screen 10. The elevator conveyor 11 is used to lift the heat transfer material to the top part of the heat exchanger from where it flows into the lower part of the heat exchanger 6, 9 along the central channel in the above-described manner, and from there further to the shaker screen 10. The shaker screen conveys the heat transfer material to the elevator conveyor 11 and separates the fine constituents therefrom.

The heat transfer material is cooled from 200° C. to 100° C. in an after-cooler 11 using a gas flow, simultaneously separating the fine constituents therefrom.

The burnt limestone powder obtained from the top part of the heat exchanger 6, 9 is taken to a carbonating step by means of a blower 12. The blower is simultaneously employed to regulate the flow rate of the fluid in the cooling part 9 of the heat exchanger.

The carbonating apparatus 13 comprises five turbulence mixers of the shock refiner type, which mixers are arranged in cascade and form cascaded steps. At each step, the product at that particular stage can be modified. The process is essentially a downstream process where all reactants flow into the same direction. Water is introduced into the apparatus through the inlet 14. The water, which determines the dry matter content of the product, is metered into a desired step of the carbonating apparatus. The water used for slaking and cooling lime is conveyed to the inlets into the steps of the carbonating apparatus by means of feed pipes and nozzles 14a to 14e.

The product obtained from the carbonating step 13, i.e. the precipitated calcium carbonate ($CaCO_3$) is separated from the fluid gas ($H_2O+CO_2$) in a separator 15 which is, e.g. a clarifier based on gravity, or a classifier of the cyclone or hydrocyclone type. The separating can also be performed by throwing the putty-like $CaCO_3+H_2O$ mixture onto a conveying support such as a belt or a plate to which it clings and is separated by doctoring, whereby the separation of gas and other constituents is easy.

The fluid gases of carbonating, i.e. water and carbon dioxide, are recovered in a jet condenser 16 comprising a jet condenser part 16a, a drop separator 16b, and a condenser 16c. In the jet condenser part 16a the gases are cooled using a water jet and the water vapour is condensated into water. The drop separator 16b prevents water from rising into the top part of the separator in the form of drops, and the condenser 16c is employed to cool the carbon dioxide entering the circulation. Uncondensed gases to be recovered in the condenser are returned for use in the process via the pipe 17 and the condensed water is removed from the bottom of the condenser 16. The carbon dioxide recovered can, for example, be conveyed to the carbonating step 13 via the pipe 17 to be used as additional carbonating gas in the second— the fifth step, or to the heat exchanger 6, 9 where it can be used as blow cleansing gas for the heat transfer material and as carrier gas for limestone. Additional carbon dioxide is taken to the carbonating apparatus via the pipe 18, whereby the carbon dioxide stream can be combined with the limestone fluid from the blower 12 prior to the first carbonating step.

The desired product, i.e. the precipitated calcium carbonate (PCC) is recovered as a PCC slurry or powder having a desired solids content.

To a large extent, the embodiment of FIG. 2 corresponds to the solution of FIG. 1. However, in the case of FIG. 2 PCC is formed by reacting calcium oxide with sodium carbonate. Hereby the carbon dioxide obtained from limestone and fuel is not used for carbonating but is instead recovered as a concentrated gas (concentration over 90%, e.g. approximately 95 to 99 vol.-%).

In FIG. 2 a storage hopper 25 for soda (i.e. sodium carbonate) is shown from which the soda is fed on a belt conveyor 26 and is taken to weighing 27 and dissolution 28 of soda. The solution obtained is fed into the causticizing apparatus 13 in the above-described manner preferably in the form of liquid mist containing finely divided droplets.

Gas is separated from the carbon dioxide/calcium oxide fluid obtained from the blower 12 in the separator 29 for burnt lime/circulation gas prior to the causticizing apparatus. The gas mainly contains carbon dioxide and is taken to a condenser 16 from where it is recovered as a very pure gas (97 vol.-%). Prior to being fed into the causticizing step, the calcium oxide is treated by a shaking screen 30.

In this application, a slurry is obtained from the PCC formation containing PCC suspended in sodium hydroxide. The solids are separated from the sodium hydroxide by means of a filtering apparatus 31, from where a product is obtained which can be treated further in a shock refiner 32 or a corresponding mixing apparatus in order to obtain the desired end product. At this stage, e.g. acid such as phosphoric acid can be added to the PCC in order to adjust the pH value. The fresh feed of sodium hydroxide is taken from a container 33 from which it is conveyed to a steeping tank 34 where it can be combined with the mother liquor of the filtering step and circulated to sodium carbonate steeping.

EXAMPLE

Lime was used which originated in Gothland and had a composition of 94.3% of $CaCO_3$ and 1.7% of $MgCO_3$, 2.1% of $SiO_2$, and 0.8% of $TiO_2$. The limestone was ground to a fineness of 97%<30 microns, this was calcinated at a temperature of 1100° C., as described above, in a pipe furnace, the flow rate being 3 m/s, length 4 m, residence time 1.33 s, the calcination degree was 98% in relation to the calcium carbonate and magnesium carbonate as total mol-%. When converted into a weight percentage, a result of 96% was obtained. Hereby even the presence of $Ca(OH)_2$ is regarded as calcination, and it was present in an amount of 2.8% by weight.

What is claimed is:

1. A process for the preparation of precipitated calcium carbonate comprising
   burning a calcium carbonate containing starting material in order to form calcium oxide,
   forming calcium carbonate of the calcium oxide in the presence of water and carbonate ions, and
   recovering the calcium carbonate wherein
   the calcium oxide is carbonated in a carbonating apparatus in a turbulence zone with carbon dioxide gas in the presence of water vapour, water droplets or mist fed into the carbonating apparatus via a water vapour/water inlet, or the calcium oxide is causticized in a caustacizing apparatus in a turbulence zone with a solution of an alkali metal or ammonium carbonate present in the form of a liquid mist containing finely divided droplets fed into the apparatus via an inlet, in order to convert the calcium oxide into calcium carbonate, wherein said process takes 3 to 60 seconds.

2. The process according to claim 1, wherein the preparation of the precipitated calcium carbonate is performed without separate slaking.

3. The process according to claim 1, wherein the forming of calcium carbonate from the calcium oxide is performed essentially without any intermediate storage between the burning of the starting material and the forming of calcium carbonate.

4. The process according to claim 3, wherein the starting material for calcium carbonate is limestone which is converted into calcium oxide at an elevated temperature, the calcium oxide is slaked and calcium carbonate is formed from calcium oxide in a same process without separating reaction products from one another.

5. The process according to claim 4, wherein the carbon dioxide gas used for carbonating the calcium oxide is mainly derived from a preceding lime burning.

6. The process according to claim 1, wherein the solution of alkali metal or ammonium carbonate is fed straight into calcium carbonate formation in order to achieve a causticizing reaction.

7. The process according to claim 1 or 6, wherein the alkali metal or ammonium carbonate is fed into a formation of carbonate as a 5 to 40% solution.

8. The process according to claim 1, wherein carbon dioxide is obtained and is used separately in another process.

9. The process according to claim 1, wherein the calcium carbonate is recovered as a 10 to 99%, aqueous slurry or dry powder.

10. The process according to claim 1, wherein refining of the calcium carbonate containing starting material is carried out in a carbon dioxide environment.

11. The process according to claim 1, wherein the starting material is burned by taking refined lime through a furnace unit in a carrier gas flow.

12. The process according to claim 1, wherein the burning takes place with oxygen and an oxidizable hydrocarbon.

13. The process according to claim 12, wherein as the oxidizable hydrocarbon, propane, butane, kerosene, diesel oil, alcohol, vegetable oil, natural gas or biogas is used.

14. The process according to claim 12 or 13, wherein at least part of excess carbon dioxide obtained from burning hydrocarbon is recovered.

15. The process according to claim 12, wherein the oxygen has a degree of purity of at least 70 vol-%.

16. The process according to claim 11, wherein the starting material is in the liquid phase prior to being burned to obtain an oxide in a fluid pipe.

17. The process according to claim 16, wherein gas flow is recovered from a last carbonating reactor and is returned to a burning reactor as a cooled dilution gas along with a limestone powder.

18. The process according to claim 1, wherein a solid matter, water and gas pass through a process equipment as a mixture of aerosol and suspension as a fluid during slaking and carbonating.

19. The process according to claim 1, wherein a hydration and the carbonating take place in a downstream direction.

20. The process according to claim 1, wherein a hydration and the carbonating occur on a surface of a same particle immediately after one another.

21. The process according to claim 1, wherein a production time from a carbonate to a carbonate is from 3 to 15 seconds.

22. The process according to claim 1, wherein essentially all process steps are carried out in an environment of carbon dioxide and water currently amended vapor and an aqueous mist.

23. The process according to claim 1, wherein the calcium carbonate is recovered as a 60 to 80% aqueous slurry or dry powder.

24. The process according to claim 1, wherein a production time from a carbonate to a carbonate is about 3 to 15 seconds.

25. The process according to claim 1, wherein essentially all process steps are carried out in an environment of carbon dioxide with water vapour or aqueous mist.

26. The method of claim 1, wherein the process takes 3 to 10 seconds.

27. The method of claim 26, wherein the burning a calcium carbonate containing starting material in order to form calcium oxide takes less than 0.5 seconds.

28. The method of claim 1, wherein the turbulence zone has an energy intensity of more than 1000 kW/m$^3$.

29. The method of claim 1, wherein the precipitated calcium carbonate form bigger particle aggregates of about 10 to 30 particles.

* * * * *

UNITED STATES PATENT AND TRADEMARK OFFICE
CERTIFICATE OF CORRECTION

PATENT NO. : 6,761,869 B1
DATED : July 13, 2004
INVENTOR(S) : Virtanen, Pentti

It is certified that error appears in the above-identified patent and that said Letters Patent is hereby corrected as shown below:

Title page,
Item [54], Title, change "PROCESS FOR PREPARING PRECIPITATED CALCIUM CARBONATE" to -- PROCESS AND APPARATUS FOR PREPARING PRECIPITATED CALCIUM CARBONATE --
Item [86], change
"PCT No.:    PCT/FI98/00700
            § 371(c)(1),
            (2), (4) Date: May 24, 2000" to
-- PCT No.:  PCT/FI98/00700
            § 371(c)(1),
            (2), (4) Date: April 11, 2000 --

Signed and Sealed this

Eighth Day of March, 2005

JON W. DUDAS
*Director of the United States Patent and Trademark Office*